Patented Jan. 22, 1946

2,393,570

UNITED STATES PATENT OFFICE 2,393,570

SYNTHESIS OF DIETHYL STILBESTROL COMPOUNDS

Miner R. Salmon, Montclair, N. J., and Martin Rubin, New York, N. Y., assignors to Wallace & Tiernan Products, Inc., a corporation of New Jersey No Drawing. Application January 23, 1943, Serial No. 473,418

2 Claims. (Cl. 260—478)

This invention relates to the synthesis of diethyl stilbestrol and its monomethyl and dimethyl ethers and intermediate products in the synthesis.

Diethyl stilbestrol and its monomethyl and dimethyl ethers are potent estrogens and useful as such. They are difficult and expensive to manufacture, the current price of perhaps the least expensive of these three materials being believed to be not less than five hundred dollars a pound.

The present invention provides a new method of synthesizing these estrogenic substances as well as intermediates required for the synthesis by a process that may be readily controlled and that give a good yield of the desired products at costs that are considered to be much below those of processes heretofore known.

Briefly stated, the invention comprises the synthesis of diethyl stilbestrol and its monomethyl or dimethyl ether by a process involving the following steps:

I.    p-$CH_3OC_6H_4CHOHCN+ROH+$acid $\longrightarrow$ anisaldehyde cyanhydrin $$CH_3OC_6H_4\underset{OR}{CH}-COOR \quad\quad (A)$$

alkyl alpha-alkoxy-p-methoxyphenylacetate

In the above formulas ROH is a primary lower aliphatic alcohol and R, therefore, an alkyl radical.

The reaction of the alcohol with the anisaldehyde cyanhydrin is conducted at an elevated temperature and in the absence of any substantial proportion of water. With the particular cyanhydrin used and the conditions stated, not only is the nitrile (CN) group converted to the ester but also there is introduced the ether group (OR). This latter feature is contrary to the teaching of the literature which is to the effect that the hydroxyl (OH) group would appear in the product instead of the ether group as shown above.

II (A) + $C_2H_5MgX$ $\longrightarrow$ 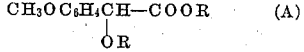 (B)

Grignard reagent    1-anisyl-1-alkoxy-2-ethyl-2-hydroxybutane (B) + aqueous mineral acid $\longrightarrow$

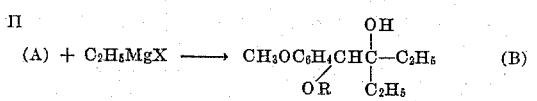 (C)

anisyl-3-hexanone-4

In this reaction, the rearrangement to anisyl-3-hexanone-4 is obtained with 1-alkoxy compounds of the type of the compound (B), whereas it has been understood heretofore that the use of a 2-hydroxy compound such as 1-anisyl-1-hydroxy-2-ethyl-2-hydroxy-butane is necessary for such rearrangement.

Furthermore, the making of the alkoxy in place of the hydroxy compound saves a third of the expensive Grignard reagent required for the step (A) to (B). Finally, the combined steps (A) to (C) may be taken without the tedious isolation and purification of compound (B), with a marked increase in yield of the compound (C) over what would otherwise be obtained.

III.    (C)+$YC_6H_4OCH_3$+Na or K $\longrightarrow$ p-halogen anisole

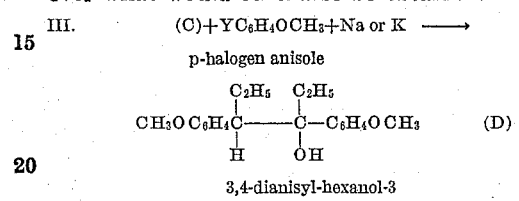 (D)

3,4-dianisyl-hexanol-3

Y represents a halogen.

This reaction gives an excellent yield of the product (D), the yield being around 70% or more based on the ketone that disappears in the reaction.

(D) dehydration $\longrightarrow$ 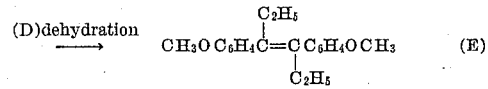 (E)

diethyl stilbestrol dimethyl ether M. P. 122–125° C. (E) and double bond isomers (F)

The dehydration step is of usual type.

IV.    (F) +iodine+metal halide$\rightarrow$(E)

This conversion of the double bond isomers to diethyl stilbestrol dimethyl ether of melting point 122° to 125° C. with the catalyst including both iodine and a metal halide of kind to be described occurs readily and with better yields than obtained with any previously used catalyst.

V.    (E) +$MOR_1$ gives demethylation

In this reaction one or both $OCH_3$ groups of compound (E) are replaced by OH groups, giving diethyl stilbestrol and diethyl stilbestrol monomethyl ether.

$MOR_1$ represents a special alcoholate used in this step of the synthesis and used in conjunction with a high boiling non-aqueous liquid that is a solvent for the alcoholate and also for the compound diethyl stilbestrol dimethyl ether. Thus there may be used the sodium or potassium alcoholate of a monoalkyl ether of diethylene glycol and a solvent consisting essentially of a monoalkyl ether of diethylene glycol of which the monoethyl ether of the diglycol is particularly suitable. The reaction gives a very high yield of the monomethyl ether of diethyl stilbestrol, this being a preferred estrogenic material. By varying the procedure, as will be described later herein, there may be produced a high yield of diethyl stilbestrol if such compound should be desired.

The invention comprises also the several steps I, II, III (first reaction only), IV, and V taken separately and the new compounds of type formulas represented by (A) and (B) above.

The synthesis has been illustrated by the type reactions given above. The synthesis will be described in detail in connection with steps I to V inclusive and will be illustrated by specific examples of the practice of the synthesis.

I. Manufacture of alkoxy esters

Anisaldehyde cyanhydrin is first made in a usual manner. It is mixed with a primary alcohol, preferably a lower alcohol such as ethyl, propyl, or butyl, in the proportion of 2 mols or somewhat more for 1 mol of the anisaldehyde cyanhydrin. N-butanol is the preferred alcohol. Dry hydrogen chloride is passed into the resulting solution. The solution initially should be substantially anhydrous, as for example, containing less than 5% of water by weight and being preferably practically free from water. When the proportion of water is substantially above 3% a decreased yield of the desired product is obtained and best results are obtained when the water present represents no more than 1 to 2% of the solution.

The mixture so made is warmed for two hours or so to an elevated temperature that is above room temperature and not substantially above the boiling point of the alcohol used, say from 60° to the said boiling point, preferably not below about 75° or above 140° C.

After the warming, the mixture is poured into water. This gives two layers, an aqueous and a non-aqueous layer, the non-aqueous layer including the desired high boiling ether ester compound (A) and the excess if any of the alcohol when the alcohol used originally is insoluble or difficultly soluble in water. The aqueous layer is separated by difference of specific gravity and the non-aqueous layer is washed with water to remove acid initially used and ammonium chloride formed in the reaction.

The washed material is then partially distilled to volatilize and separate remaining alcohol if any. The high boiling material which remains is distilled and the principal fraction is accepted as the desired alkyl alpha-alkoxy-p-methoxyphenylacetate. When butyl alcohol is the alcohol used the boiling point of the acetate is about 145° C. at 0.15 mm. pressure.

*Example 1.*—Three hundred grams of hydrogen cyanide and 0.1 g. of sodium metal were dissolved in 850 cc. of n-butyl alcohol and 1360 g. of anisaldehyde was added with stirring, the temperature being maintained below 10° C. The preparation was allowed to stand in the icebox over night and the next day a solution of 740 g. of dry hydrogen chloride in 3.5 liters of n-butyl alcohol was added with stirring. The mixture was heated under reflux for 2½ hours and poured into water. The non-aqueous layer was separated, washed with water, dried, and the solvent alcohol was distilled off. The residue was distilled in vacuum. Two thousand two hundred and thirty-five g. of the butyl ether of butyl p-methoxymandelate of boiling point 145°/0.15 mm. was obtained.

*Example 2.*—Five hundred and forty-eight g. of anisaldehyde, 320 g. of potassium cyanide, and 500 cc. of water were mixed in a flask fitted with with a stirrer, a thermometer, and a dropping funnel. The stirrer was started and 350 cc. of concentrated hydrochloric acid was added drop by drop meanwhile maintaining the temperature below 10° C. by external cooling. When all the hydrochloric acid had been added the upper layer solidified to a cake of anisaldehyde cyanhydrin. This cake was dissolved in ether; the ether layer was separated and washed with water and dried. Two hundred and eighty-eight g. of dry hydrogen chloride in 1 liter of isoamyl alcohol was run into the ether solution. The ether was distilled off and 72 g. of dry hydrogen chloride was passed into the solution. The mixture was then boiled under reflux for 2 hours, poured into water, and the alcohol layer was separated, washed with water, and dried. The alcohol was distilled off and the residue distilled in vacuum. The product was the isoamyl ether of isoamyl p-methoxymandelate, yield 860 g. The boiling point was 150° C. at 0.5 mm.

*Example 3.*—One hundred and thirty-six g. of anisaldehyde, 32 g. of hydrogen cyanide, and 0.1 g. of sodium metal were dissolved in 450 cc. of absolute ethyl alcohol. The mixture was allowed to stand in the icebox over night and then 450 cc. of absolute ethyl alcohol containing 72 g. of dry hydrogen chloride was added. The mixture was boiled under reflux for 4 hours and worked up as described in Examples 1 and 2 above. One hundred and fifteen g. of product was obtained boiling at 125° C. at 0.5 mm. pressure, and was found to consist of approximately equal parts of ethyl p-methoxymandelate and of the ethyl ether of ethyl p-methoxymandelate.

II. Synthesis of anisyl-3-hexanone-4

The methoxyphenylacetate derivative made as described under I above is then added slowly, preferably with cooling, under a reflux condenser, and with stirring during a half hour or so, to a dry ether solution of ethyl Grignard reagent such as ethyl magnesium bromide, chloride, or iodide or ethyl magnesium ethyl-sulfate. There results a compound such as shown at (B) above except that the OH group is replaced by ½ Mg. This magnesium derivative is then treated with a dilute acidic material such as hydrochloric, sulphuric, or acetic acid or ammonium chloride in manner that is customary in replacing the magnesium by hydrogen, to give the hydroxy compound shown at (B), namely a 1-anisyl-1-alkoxy-2-ethyl-2-hydroxybutane, the term anisyl as used herein being understood to be para-methoxyphenyl.

The ether is then evaporated and the remaining hydroxy butane derivative aqueous suspension is treated with sufficient selected strong acid to bring the aqueous portion to a concentration of for example, 10% to 50% sulphuric acid, or 15% to 35% hydrochloric acid, or 20% to 50% phosphoric acid. The product of the rearrangement induced by warming the crude hydroxy butane derivative in acidic medium is anisyl-3-hexanone-4, an alcohol being a by-product.

In spite of the several possible compounds that would be expected to be formed in this pinacol arrangement of the complex molecule, there is obtained in identifiable amounts practically none of the other expected products and the yield of the desired hexanone in a typical run is of the order of 65%. The compound (A) first formed above and containing the ether group is prepared from the anisylaldehyde cyanhydrin with an excellent yield, the yield being ordinarily 85% to 90% based on the anisylaldehyde used, so that the overall yield in step I and II is excellent for reactions of the present complexity.

Detailed examples of this synthesis follow.

*Example 1.*—To the Grignard reagent prepared from 908 g. of ethyl bromide and 192 g. of magnesium 1,030 g. of the n-butyl ether n-butyl ester of p-methoxymandelic acid was added slowly. The reaction mixture was stirred for one hour after all materials had been added and then decomposed in the usual manner with the addition of 10% sulfuric acid. The ether was removed by distillation, 30% sulfuric acid was added in an amount equal to one-half the volume, and the hydroxy butane rearranged by boiling it for 3½ hours under reflux. The product was separated from the sulfuric acid in a separatory funnel, washed with water and distilled in vacuum. The boiling point was 116° C. at 0.7 mm. pressure or 133° C. at 4 mm. pressure. The yield was 65–70% of the theory.

*Example 2.*—To the Grignard reagent prepared from 22.4 g. of magnesium and 100 g. of ethyl bromide, 87.7 g. of the ethyl ether of the ethyl ester of p-methoxymandelic acid was added. The reaction was carried out from this point exactly as described in Example 1. Anisyl-3-hexanone-4 was obtained in a yield of 65–75% of the theoretical.

*Example 3.*—The isoamyl ether isoamyl ester of p-methoxymandelic acid was allowed to react with ethyl magnesium bromide in the same manner as described in Examples 1 and 2 of this section. The oily product from this reaction was rearranged with 30% sulfuric acid as described above and distilled in vacuum. Anisyl-3-hexanone-4 was obtained in a yield of 65–70%.

III. Synthesis of diethyl stilbestrol and related compounds

The anisyl-3-hexanone-4 is mixed with p-halogen anisole and sodium or potassium under petroleum ether, toluene, ether, or other inert solvent for the p-halogen anisole and the ketone. Preferably the hexanone and the p-chloranisole are premixed in equimolecular proportions before being added slowly to the sodium or potassium at such a rate that the heat of the reaction keeps the solvent boiling gently. The whole mixture is then allowed to react under a reflux condenser, no cooling ordinarily being necessary and the inert liquid present volatilizing sufficiently to exclude air. If the best results are to be obtained, the temperature should be maintained at all times below 110° and preferably within the range of about 20° to 80° C. Above approximately 110° C. particularly a pronounced decrease in the yield is observed.

After the reaction is substantially complete, the sodium compounds are removed by adding water to wash out sodium chloride formed as a by-product in the reaction and also sodium hydroxide which is formed by hydrolysis due to the water added. The product is 3,4-dianisyl-hexanol-3, compound (D) above.

On cooling, the compound may precipitate as a solid material. In any case, the liquid used is evaporated and the residue distilled, the foreshots of inert liquid originally used and any unreacted raw materials being discarded. In typical preparations the fraction which is accepted as the desired hexanol derivative boils at 200° to 210° C. at ½ mm. pressure.

The distilled product is then dehydrated in conventional manner and as will be described later, to give diethyl stilbestrol dimethyl ether of melting point about 122° to 125° C. and its double bond isomers which frequently do not crystallize at ordinary temperatures.

By "double bond isomers" is meant the compounds which differ from the diethyl stilbestrol dimethyl ether of stated melting point only in the molecular arrangement with respect to the double bonds. Thus cis and trans forms are examples of such double bond isomers. Other double bond isomers result from a displaced position of the double bond in the formula of this compound which is shown at (E) above.

Detailed examples of the synthesis follows.

*Example 1.*—46 g. (2 mols) of sodium shot was covered with 400 cc. of petroleum ether of B. P. 35–60° C. in a three necked flask fitted with a mechanical stirrer, a reflux condenser, and a dropping funnel. To the dropping funnel was added a mixture of 206 g. (1 mol) of anisyl-3-hexanone-4 and 156.7 g. (1/1 mols) of p-chloranisole and the dropping funnel was adjusted so that this mixture dropped slowly into the flask. The stirrer was started and the flask warmed gently to start the reaction. The rate of addition of the mixture of p-chloroanisole and anisyl-3-hexanone-4 was adjusted so that the heat of the reaction kept the solvent boiling gently. When all the reagents had been added, external heat was applied to keep the reaction mixture boiling for one half hour. Water was then added to dissolve the inorganic materials and the two layers separated in a separatory funnel. The upper layer containing the desired products of the reaction dissolved in petroleum ether was washed with water, dried, the solvent was distilled off and the residue distilled in vacuum. 108 g. (.52 mol) of unreacted anisyl-3-hexanone-4 was recovered unchanged from the reaction mixture and identified by the boiling point of 133° C. at 4 mm. pressure. The higher boiling fraction (B. P. 150°–210° C./0.5 mm.) was collected separately and then dehydrated in conventional manner, as by being heated for ten minutes at 210° C. with 20 g. of potassium acid sulfate. The product was again distilled and the fraction boiling at 160–165° C. at 1 mm. pressure was collected. It was identified as a mixture of diethyl stilbestrol dimethyl ether with one or more double bond isomers similar to that prepared by Dodds et al. (Proc. Royal Soc. London B. 127, 150, 1939.) The yield was 100 gms. of mixed liquid and solid products. This is 71% of the theoretical based on the ketone utilized (not recovered) in the reaction.

*Example 2.*—The reaction was carried out exactly as described in Example 1 except that 188 gms. (1.1 mols) of p-bromanisole was used in place of the 156.7 gms. of p-chloranisole. The product was a mixture of diethyl stilbestrol dimethyl ether with the isomers of this compound described in Example 1 of this section in a yield of 45% based on the ketone utilized.

IV. Isomerization of double bonds

The diethyl stilbestrol derivative desired is the one of the melting point stated, namely, 122–125° C. It is separated by crystallization from the liquid double bond isomers. These isomers are then treated with a catalyst to convert them to the desired material of 122° to 125° C. melting point.

For this conversion, an isomerization catalyst including both iodine and a halide of aluminum, stannic tin, antimony, boron, zinc, arsenic, ferric iron, nickelic nickel, or the like, is used. These halides are mostly those that are commonly used in the Friedel and Crafts synthesis.

The amounts of the iodine and halide required are small, as they act by catalytic action. Thus, there may be used about 0.05% to 1% each of the halide and iodine, amounts of each of the order of 0.1% of the weight of the liquid isomers being preferred. With the iodine alone or the halide alone but without both, the reaction is so extremely slow as to be inoperative commercially.

In effecting this isomerization the liquid isomers are treated with the catalyst in the manner described in the examples below. The resulting mixture is then cooled, as in a refrigerator, and preferably after the addition of a thinning solvent, such as petroleum ether, or methyl or ethyl alcohol.

On cooling, crystals of the isomer of melting point 122° to 125° form, ordinarily in amount of the order of about one-quarter of the liquid isomers used.

The liquid isomers are then separated from the crystals of the desired isomer and are reworked in the same manner as before, so that there is obtained eventually a satisfactory yield of the isomer of desired melting point.

Detailed examples of the method of isomerization follow:

*Example 1.*—A quantity of 2300 g. of the mixed liquid double bond isomers of diethyl stilbestrol dimethyl ether was heated at 125° C. for one-half hour with 5 g. of iodine and 5 g. of $FeCl_3.6H_2O$. The product was cooled and taken up in petroleum ether and allowed to crystallize in the icebox. The crystalline diethyl material was filtered off and proved to be crystalline diethyl stilbestrol dimethyl ether. The yield was 610 g. or 26%. After recrystallization from alcohol or from petroleum ether the melting point was 122° C.

The filtrate from the above experiment was concentrated and the isomerization repeated. Each repetition gave a further yield of 20 to 30% of the remaining liquid isomers converted to crystalline diethyl stilbestrol dimethyl ether. By a sufficient number of repetitions, crystalline diethyl stilbestrol dimethyl ether was obtained from the double bond isomers in almost quantitative yields.

*Example 2.*—One g. of the mixed liquid isomers of diethyl stilbestrol dimethyl ether was mixed with one drop of a 40% solution of boron trifluoride in ether and a crystal of iodine. The mixture was rotated to insure complete mixing and allowed to stand 24 hours at room temperature. Crystalline diethyl stilbestrol dimethyl ether was obtained in a yield of 20–30%.

*Example 3.*—One g. of crystalline 3-4-dianisyl-hexene-2 of melting point 50° C. was heated with a trace of iodine and a trace of $FeCl_3.6H_2O$ at 125° C. for one-half hour. After crystallization from petroleum ether the product was identified as diethyl stilbestrol dimethyl ether in a yield of 36%.

V. Demethylation

The last step of the complete synthesis involves complete or partial demethylation of the diethyl stilbestrol dimethyl ether of melting point 122° to 125° C. to give either the monomethyl ether of diethyl stilbestrol or diethyl stilbestrol.

This demethylation is effected by forming a mixture of the diethyl stilbestrol dimethyl ether with a solvent that is a glycol ether, suitably monoethyl, monopropyl, monobutyl or like alkyl ether of a polyglycol of which diethylene glycol is suitable, and a special kind of alcoholate. Thus there is used to advantage as solvent the monoethyl ether of diethylene-glycol. The glycol ether used must be a solvent for the stilbestrol compound and also for the alcoholate to be described.

The alcoholate used is one of sodium or potassium, the alcoholate being suitably derived from the solvent liquid above described by replacing a hydrogen of the hydroxy group in the said solvent by sodium or potassium. Thus there is used to advantage the sodium or potassium derivative (alcoholate) of one of the glycol ethers.

Suitably the diethyl stilbestrol dimethyl ether is added to a premade solution of the alcoholate in the solvent liquid, such as a glycol ether, and the whole is then boiled under reflux until test of material removed shows the desired degree of demethylation. This ordinarily requires 2 to 10 hours at the temperature of boiling of the glycol ether used, say at about 160° to 250° C., and preferably about 200° to 230° C.

The mixture is then cooled, poured into water and acidified. There precipitates a mixture of diethyl stilbestrol, its monomethyl ether, and ordinarily some unchanged dimethyl ether.

These compounds are separated from the liquid phase, washed, and then separated from each other in manner that is conventional in the separation of these compounds from each other.

The compound preferred for use as the final product or estrogen is the monomethyl ether of diethyl stilbestrol.

*Example 1.*—The sodio derivative of Carbitol (ethyl ether of diethylene glycol) was prepared by dissolving 50 g. of sodium in 640 cc. of Carbitol. When the reaction was complete, 200 g. of diethyl stilbestrol dimethyl ether was added. The solution was boiled under reflux for 3½ hours. At the end of this time the reaction mixture was poured into water and acidified. The product which crystallized out of the solution was filtered off and separated into diethyl stilbestrol, diethyl stilbestrol monomethyl ether, and diethyl stilbestrol dimethyl ether, by virtue of the solubility of diethyl stilbestrol in $\frac{1}{10}$ N aqueous potassium hydroxide and the solubility of diethyl stilbestrol monomethyl ether in $\frac{1}{10}$ N KOH in 50 per cent alcohol. Diethyl stilbestrol dimethyl ether is insoluble in these solvents. The reaction yielded 15% of diethyl stilbestrol, 45% of diethyl stilbestrol monomethyl ether, and 36% of unchanged diethyl stilbestrol dimethyl ether. The diethyl stilbestrol, diethyl stilbestrol monomethyl ether, and diethyl stilbestrol dimethyl ether were characterized by their melting points of about 168° C., 116° C., and 123° C., respectively.

*Example 2.*—6¼ g. of sodium was dissolved in 180 cc. of butyl Carbitol (monobutyl ether of diethyleneglycol). 25 g. of diethyl stilbestrol dimethyl ether was added to the solution and the mixture boiled under reflux for three hours. The product was worked up as in Example 1 of this section and yielded 23% of diethyl stilbestrol, 50% of diethyl stilbestrol monomethyl ether, and 23% of unchanged diethyl stilbestrol dimethyl ether.

*Example 3.*—15 g. of diethyl stilbestrol dimethyl ether and 10.6 g. of potassium hydroxide were dissolved in 200 cc. of Carbitol, and the mixture was distilled until half of the Carbitol was removed. (This operation removes water formed from the potassium hydroxide and the Carbitol.) The residual solution was boiled for six hours under reflux. The reaction mixture was worked up exactly as described in Example 1 of this section. The product was found to consist of 6 g. of diethyl stilbestrol dimethyl ether, 4.3 g. of diethyl stilbestrol monomethyl ether, and 0.5 g. of diethyl stilbestrol.

It will be understood that it is intended to cover all changes and modifications of the examples of the invention herein chosen for the purpose of illustration which do not constitute departures from the spirit and scope of the invention.

What is claimed is:

1. The method of making an alkyl alpha-alkoxy-p-methoxyphenylacetate which comprises forming a substantially anhydrous mixture including anisaldehyde cyanhydrin, an excess of a primary aliphatic alcohol, and hydrogen chloride, warming the mixture to an elevated temperature so as to produce alkyl alpha-alkoxy-p-methoxyphenylacetate, and separating the said compound from the remainder of the resulting mixture.

2. An alkyl alpha-alkoxy-p-methoxyphenylacetate of the general formula

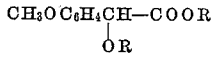

R representing an alkyl group.

MINER R. SALMON.
MARTIN RUBIN.